United States Patent Office 2,863,716
Patented Dec. 9, 1958

2,863,716

SULPHUR DIOXIDE LEACHING OF URANIUM CONTAINING MATERIAL

Arvid Thunaes, Fred Thomas Rabbitts, Kenneth Donald Hester, and Harold William Smith, Ottawa, Ontario, Canada, assignors, by mesne assignments, to the United States of America as represented by the United States Atomic Energy Commission No Drawing. Application March 30, 1954
Serial No. 419,904

5 Claims. (Cl. 23—14.5)

This invention relates to a process for extracting uranium from uranium containing material, and more particularly to a leaching process involving the use of sulphur dioxide.

The object of this invention is to provide a process which is of low reagent and equipment cost so as to be particularly suitable for the treatment of ores or mill tailings but which gives a good recovery of uranium. Because of the large bulk of the material to be treated in the case of low grade ores and mill tailings it is of the greatest importance to an economically sound process that reagent costs be minimized. In the present process low reagent cost is achieved by providing a process in which no sulphuric acid is required nor chemical oxidizing agent such as chlorate and in which the uranium can be economically precipitated from the leach solution.

A further object of this invention is to provide a process which is suitable for the treatment of ores in which not all of the uranium is in the fully oxidized hexavalent state. Thus the present process is well adapted to the treatment of ores such as pitchblende.

In accordance with this invention regarded in its broadest aspect the uranium containing material is treated by leaching with an aqueous solution containing sulphur dioxide gas, and with aeration, in the presence of a substance selected from the group consisting of soluble iron and manganese and mixtures thereof.

Uranium can be precipitated from the leach solution produced by the foregoing treatment by an inexpensive process involving adjusting the pH of the leach solution to about 1.25 and adding iron powder in the presence of a precipitant selected from the group consisting of soluble phosphates, arsenates and fluorides. The suitability of the leach solution for this method of recovery is an important advantage of this process.

The process of this invention will now be discussed in greater detail. As has been indicated, the uranium bearing material which is treated in accordance with this invention can include uranium ore or mill tailings. It is necessary initially to remove any free iron produced during the grinding of the material. This can readily be achieved by the use of magnetic separation. If substantially all of the free metallic iron is not removed it will cause the uranium prematurely to precipitate. This is exemplified in Example I. The free metallic iron may also interfere with the oxidation required for efficient leaching.

Example I 179 grams wet ore (160 grams dry) with magnetics not removed were repulped in 320 mls. of a 4% $SO_2$ solution containing additional iron, phosphate and sulphate sufficient to simulate a recycled barren. The repulped sample was transferred to an aerator tube through which a 200 cc./min. current of air was passing and aerated for 4½ hours. The $U_3O_8$ extraction at the end of this time was negligible (2.5%). In an identical test with ore with its metallics removed, $U_3O_8$ extraction after 5½ hours was 62.5%.

After wet grinding the ore and magnetic separation of metallic iron from the slurry, the slurry preferably may be subjected to filtration. The filter-cake is added to a solution of sulphur dioxide made from water or barren solution by introducing gas from sulphur burner roaster or return process gas. If the ore is suitable, the filtration step may be omitted and the slurry resulting from grinding the ore may be immediately treated with the sulphur dioxide and aeration. In either case a pulp is formed having a liquid to solid ratio of about 1:1 to 2:1. This pulp is then agitated at atmospheric temperature and pressure with air in the presence of soluble iron and/or manganese. Sulphur dioxide gas is added if required to maintain a pH of about 1 to 2. It is preferred that the sulphur dioxide be added intermittently for this purpose and not continuously. The sulphur dioxide gas can either be added to the slurry or to the aqueous solution before formation of the slurry. Some ores contain sufficient soluble iron and manganese for the purpose of this process. If there is a deficiency, additional soluble iron or a manganese salt such as manganese sulphate must be added to give a solution containing 1 to 2 grams of iron per litre or 0.5 to 1 gram of manganese sulphate per litre. Preferably the soluble iron is added as ferric iron. If ferrous iron is used it will be oxidized by the aeration in the presence of sulphur dioxide to the ferric state. The ferric iron acts as a carrier for the oxygen and converts tetravalent uranium to the hexavalent form. Air alone, without a substance such as ferric iron, will not oxidize tetravalent uranium at a useful rate. (The soluble manganese acts in a similar manner.) The aeration of the aqueous $SO_2$ solution in the presence of ferric iron also results in the formation of a proportion of oxy-sulphur acids. The rate of aeration is important and should be sufficient to form a small proportion of oxy-sulphur acids in the presence of the ferric iron but not sufficient to sweep sulphur dioxide from the solution. The air should be properly diffused and this may be accomplished with conventional types of gas diffusers. The use of controlled aeration with diffused air in the presence of substances such as ferric iron results in oxidation of uranium to the hexavalent state, oxidation of ferrous to ferric iron, and the formation of oxy-sulphur acids to assist in maintaining the pH value at the desired level of 1 to 2 without the use of an excessive quantity of sulphur dioxide. If air were not used the result would not merely be an addition in the cost of the sulphur dioxide required for a given amount of ore, but also the dissolution of the uranium would be decreased, as part of the uranium would remain in the tetravalent state. Also if aeration is not employed, the sulphur dioxide could have an undesirable reducing action on oxidizing agents such as ferric iron. Aeration is continued for a period of about 3 to 24 hours. The effect of aeration will be illustrated by Examples II and III.

Example II 1,300 grams wet ore (1,150 grams dry) were treated to remove the magnetics. The ore was repulped with 10 pounds per ton of ferric iron (as the sulphate) and 2,300 ml. of aqueous 8 percent $SO_2$ solution for 24 hours. No aeration was employed and the resultant $U_3O_8$ extraction was 59 percent.

Example III 190 grams of the same wet ore as in Example II (160 grams dry) were treated to remove magnetics, repulped with 10 pounds per ton of ferric iron (as the sulphate) and 300 ml. of aqueous 8 percent $SO_2$ solution. The mixture was placed in an aerator tube, and air was added at 300 cc. per minute. After only 3 hours extraction was nearly 94 percent.

After agitation with aeration the slurry is filtered by vacuum filtration and the residue is discarded. The pH of the filtrate is adjusted to about 1.25 by the addition of sulphur dioxide gas and, if the solution does not contain sufficient precipitant a soluble phosphate, fluoride or arsenate is added. The solution is then agitated with iron powder (150–200 mesh size) to precipitate the uranium. The precipitate slurry is treated in a magnetic separator to recover excess metallic iron for re-use. This slurry is then filtered in a filter press. The press filtrate is treated in a vacuum tank to recover excess sulphur dioxide. This sulphur dioxide gas can be recycled to adjust the pH of the solution prior to precipitation and any excess sulphur dioxide can be used in the initial leaching step.

As an alternative to treatment of the uranium containing material in aqueous slurry, the material may in some cases conveniently be treated by percolation with a solution containing sulphur dioxide accompanied by aeration.

An important advantage of the process of this invention is that the leach solution can effectively be treated for the precipitation of the uranium by relatively cheap metallic iron powder in the presence of an arsenate, phosphate or fluoride or mixtures thereof. It is not necessary to use a more costly process involving a substance such as aluminum powder. This is because the sulphur dioxide gas in the leach solution has a reducing effect, as shown by the E. M. F. value of the solution. It has been found that before iron powder can be used the E. M. F. indicated by a saturated calomel-platinum electrode system must be reduced to approximately +300 millivolts. This condition is achieved by the excess sulphur dioxide in the leach solution.

The process of this invention will be further illustrated by Examples IV to VII inclusive.

Example IV 190 grams of wet ore (160 grams dry) from which abraded grinding iron was removed were repulped in 300 ml. of a solution of $SO_2$ in water by mixing in a container with stirring. Air was introduced through a stoneware frit at the rate of 300 cc. per minute. Ferric iron was added as sulphate in amounts corresponding to 10 pounds per ton ore.

The aeration was continued for 1 hour at room temperature, 25° C. The pH value dropped to 1.55 due to formation of oxy-sulphur acids, hence no additional $SO_2$ was added. The results were as follows:

|  | Percent | Percent Extraction of $U_3O_8$ |
|---|---|---|
| Original $U_3O_8$ content of ore | 0.24 |  |
| Residue after 1 hour treatment | 0.043 | 82 |
| Residue after 3 hour treatment | 0.015 | 93.7 |
| Residue after 5 hour treatment | 0.014 | 94.2 |

Example V

The procedure was identical to that in Example IV except that the ferric iron added was only 5 pounds ferric iron per ton of ore (in the form of ferric sulphate). The extraction after 4 hours leaching time was 89.4 percent from an ore containing originally 0.24 percent $U_3O_8$.

Example VI 468 grams wet (400 grams dry) of ground ore with magnetics removed was leached with $SO_2$ solution for 24 hours at a liquid:solid ratio of 3:2. Air was introduced through diffusers together with sufficient $SO_2$ as required to maintain a pH value of 1.75. The temperature was 20° C. The extraction was 87.6 percent of the uranium present in the head sample. The leach filtrate containing 2.13 grams $U_3O_8$ and 9.95 grams iron per litre was treated with sulphur dioxide, a phosphate and metallic iron powder to precipitate 95 percent of the uranium contained in the filtrate.

Example VII

A solution resulting from a sulphur dioxide leach contained 0.6 grams $U_3O_8$ per litre. Sufficient phosphate to precipitate uranium plus 50 percent excess was added and the pH value adjusted by introduction of $SO_2$ to 1.2. Metallic iron powder (minus 150 mesh) was added in a theoretical excess of 2.5 grams per litre. Samples were taken at intervals as shown below:

| Time | Barren Solution, Percent $U_3O_8$ | Percent Recovery $U_3O_8$ |
|---|---|---|
| Nil |  |  |
| 5 min | 0.0097 | 98.4 |
| 10 min | 0.0071 | 98.8 |
| 20 min | 0.0040 | 99.3 |

It will be appreciated from the foregoing that the process of this invention provides a highly convenient, practical and inexpensive method of treating a variety of ores and other uranium containing materials. It is adapted for materials in which uranium exists in the hexavalent form and is particularly suitable for materials in which part or all of the uranium is in the tetravalent form.

We claim:

1. A process for extracting uranium from uranium containing material at least part of the uranium of which is tetravalent comprising the steps of comminuting said material, magnetically separating metallic iron produced during said comminuting from said material, leaching said material with an aqueous solution containing sulphur dioxide and with aeration to an extent sufficient to form a proportion of oxy-sulphur acids to give a pH of about 1 to 2 but insufficient to give excessive removal of sulphur dioxide gas and containing a substance selected from the group consisting of soluble ferric iron in an amount of 1 to 2 grams of iron to a litre of solution and manganese in an amount of 0.5 to 1 gram of manganese to a litre of solution and mixtures thereof to provide a leach solution, adjusting the pH of the leach solution to about 1.25 and precipitating uranium from said solution by adding metallic iron powder in the presence of a precipitant selected from the group consisting of soluble phosphates, arsenates and fluorides and mixtures thereof.

2. A process for extracting uranium from uranium containing material at least part of the uranium of which is tetravalent comprising the steps of grinding said material, magnetically separating metallic iron produced during grinding from said material, treating said ground material in aqueous slurry with sulphur dioxide and aeration to an extent sufficient to form a proportion of oxy-sulphur acids to give a pH of about 1 to 2 but insufficient to give excessive removal of sulphur dioxide gas in the presence of a substance selected from the group consisting of soluble ferric iron in an amount of 1 to 2 grams of iron per litre of slurry and manganese in an amount of 0.5 to 1 gram of manganese per litre of slurry and mixtures thereof to provide a leach solution, adjusting the pH of the leach solution to about 1.25 and precipitating uranium from said solution by adding metallic iron powder in the presence of a precipitant selected from the group consisting of soluble phosphates and fluorides and mixtures thereof.

3. A process as in claim 2 in which the slurry is formed with an aqueous solution of sulphur dioxide and in which additional sulphur dioxide is added during aeration to maintain the pH at about 1 to 2.

4. A process of recovering uranium from uranium containing material at least part of the uranium of which is tetravalent which comprises grinding said material, magnetically separating free metallic iron produced during said grinding from said material, forming a slurry of said iron free material in an aqueous solution of sulphur dioxide, adding a salt selected from the group consisting of soluble ferric iron salts, soluble manganese salts, and mixtures thereof to said slurry, aerating said slurry in the presence of said added salt with diffused air to an extent sufficient to convert tetravalent uranium to the hexavalent form and to form a small proportion of oxy-sulphur acids to give a pH of about 1 to 2 but insufficient to cause excessive removal of sulphur dioxide gas from the slurry, separating the leach liquor from said slurry after from 3 to 24 hours of aeration, adjusting the pH of said leach liquor to about 1.25 by the addition of sulphur dioxide, adding to the leach liquor a precipitant for tetravalent uranium selected from the group consisting of soluble phosphates, arsenates, and fluorides and mixtures thereof, adding metallic iron powder to said leach solution to cause reduction of hexavalent uranium to the tetravalent form and its precipitation by said precipitant, and magnetically recovering excess iron powder from said precipitate.

5. A process as set forth in claim 4 in which the salt added to the slurry is ferric sulphate and the precipitant added to the leach liquor is a soluble phosphate.

References Cited in the file of this patent

UNITED STATES PATENTS

| | | |
|---|---|---|
| 880,645 | Fleck et al. | Mar. 3, 1908 |
| 1,070,313 | Adams | Aug. 12, 1913 |
| 1,095,377 | Burfeind | May 5, 1914 |
| 2,304,178 | Keyes | Dec. 8, 1942 |
| 2,342,704 | Striplin | Feb. 29, 1944 |
| 2,689,165 | Harvey | Sept. 14, 1954 |
| 2,736,634 | Gaudin et al. | Feb. 28, 1956 |
| 2,761,758 | Long et al. | Sept. 4, 1956 |
| 2,815,261 | Thunaes et al. | Dec. 3, 1957 |

FOREIGN PATENTS

| | | |
|---|---|---|
| 696,021 | Great Britain | Aug. 19, 1953 |

OTHER REFERENCES

Mellor: "Comprehensive Treatise on Inorganic and Theoretical Chemistry," vol. 12, page 74 (1932), published by Longmans, Green & Co., London.